(12) United States Patent
Menkhoff

(10) Patent No.: US 8,090,330 B2
(45) Date of Patent: Jan. 3, 2012

(54) SYSTEM HAVING A FILTER

(75) Inventor: Andreas Menkhoff, Oberhaching (DE)

(73) Assignee: Infineon Technologies AG, Neubiberg (DE)

( * ) Notice: Subject to any disclaimer, the term of this patent is extended or adjusted under 35 U.S.C. 154(b) by 1315 days.

(21) Appl. No.: 11/692,644

(22) Filed: Mar. 28, 2007

(65) Prior Publication Data
US 2008/0242244 A1 Oct. 2, 2008

(51) Int. Cl.
H03C 1/62 (2006.01)
(52) U.S. Cl. .................... 455/114.2; 375/229
(58) Field of Classification Search ............... 455/114.2, 455/295; 375/229; 333/165–202
See application file for complete search history.

(56) References Cited

U.S. PATENT DOCUMENTS

| 7,050,918 | B2 | 5/2006 | Pupalaikis et al. | |
| 7,161,979 | B2* | 1/2007 | Wildhagen | 375/229 |
| 2003/0076907 | A1 | 4/2003 | Harris | |
| 2004/0208241 | A1* | 10/2004 | Jiang | 375/229 |

OTHER PUBLICATIONS

A photocopy of the First Office Action for Chinese Patent Application No. 200810084098.8 mailed Sep. 25, 2009 (2 pages).
"Suppression of Adjacent-Channel, Cochannel, and Intersymbol Interference by Equalizers and Linear Combiners" by Brent R. Petersen, IEEE Transactions on Communications, vol. 42, No. 12, Dec. 1994. pp. 1-10.
"Polyphase IIR Filter Banks for Subband Adaptive Echo Cancellation Applications" by Artur Krukowski and Izzet Kale, Applied DSP and VLSI Research Group, Univ. of Westminster, 115 New Cavendish Street, London, W1W 6UW, United Kingdom. 0-7803-7762-1/03 2003, IEEE.
"On Adaptors for Wave Digital Filters" by Alfred Fettweis, IEEE Transactions on Acoustics, Speech, and Signal Processing, vol. ASSP-23, No. 6, Dec. 1975. pp. 513-524.
"Eigenfilter Approach for the Design of Allpass Filters Approximating a Given Phase Response" by Truong Q. Nguyen et al. , IEEE Transactions on Signal Processing, vol. 42, No. 9, Sep. 1994. I053-i87X/94$04.00 1994 IEEE.

\* cited by examiner

*Primary Examiner* — Nay A Maung
*Assistant Examiner* — Angelica Perez
(74) *Attorney, Agent, or Firm* — Dicke, Billig & Czaja, PLLC

(57) ABSTRACT

A system having a filter is disclosed. One embodiment includes at least two polyphase filter branches, each of the polyphase filter branches including a respective recursive allpass filter, wherein the filter approximates a linear filter.

16 Claims, 5 Drawing Sheets

SYSTEM HAVING A FILTER

BACKGROUND

This invention generally relates to a system having filters. In one embodiment, the system includes a receiving and/or transmitting system.

In radio transmission systems, adjacent-channel interference and intersymbol interference are usually unwanted phenomena. Adjacent-channel interference is the interference due to signals with different carrier frequencies which are close enough to cause mutual overlaps in the spectra. Intersymbol interference is the interference among the data of interest. Adjacent-channel interference and intersymbol interference may be suppressed by filters implemented in the transmitting station and the receiving station.

For these and other reasons, there is a need for the present invention.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is illustrated by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
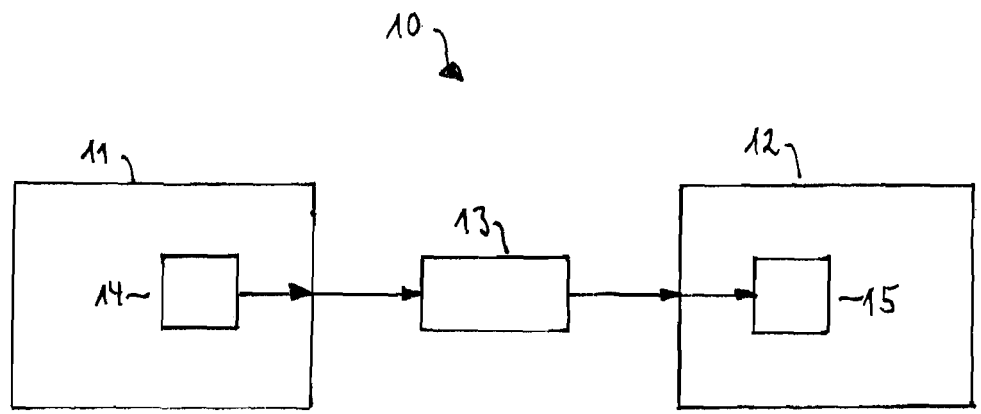
FIG. 1 schematically illustrates a radio transmission system.

One embodiment of a block diagram of a radio transmission system 10 is illustrated in FIG. 1. The transmission system 10 is composed of a transmitting station 11 and a receiving station 12. Between the transmitting station 11 and the receiving station 12 radio signals are transmitted via a channel 13. In the transmitting station 11 a first filter 14 is provided to filter signals to be transmitted. Analogously, a second filter 15 is provided in the receiving station 12 to filter received signals. Both filters 14 and 15 may be digital filters.

The purpose of the filters 14 and 15 is to minimize adjacent-channel interference and intersymbol interference. To satisfy this, both filters 14 and 15 may be root-raised-cosine filters so that the total response of the system is raised-cosine. A raised-cosine filter has the ability to minimize intersymbol interference. By using root-raised-cosine filters at each end of the transmission system 10, the matched filter condition as well as the Nyquist criterion are satisfied.

Figure 2:
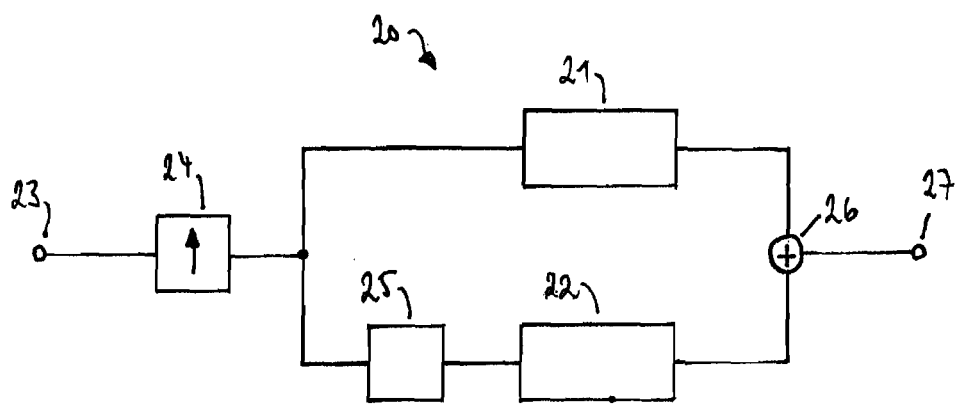
FIG. 2 schematically illustrates a circuit diagram of a filter according to an exemplary embodiment.

In FIG. 2 a filter 20 is schematically illustrated, which serves as an exemplary embodiment and may be used as at least one of the filters 14 and 15 in the transmission system 10 illustrated in FIG. 1.

The filter 20 has an input terminal 23 to receive data to be filtered. An upsampling operator 24 carries out a vertical upsampling process of the samples received at the input terminal 23. Upsampling involves increasing the rate of the input signal by inserting samples having a zero value. The number of data may be increased by a factor of two using the upsampling operator 24. After the upsampling operator 24, the signal path is divided into two polyphase filter branches. The upper polyphase filter branch contains a filter 21, the lower polyphase filter branch contains a filter 22 and a delay element 25. The signals outputted by the filters 21 and 22 are summed by an adder 26 and are provided to an output terminal 27 for further processing.

Both filters 21 and 22 are recursive allpass filters. A filter is an allpass filter if the magnitude response of its transfer function is constant or approximately constant. The filter 20 composed of the allpass filters 21 and 22 may approximate a linear filter. The phase response of a linear filter is a linear function of frequency, excluding the possibility of wraps at $\pm \pi$.

The filter 20 may be designed such that it has the following transfer function H(z):

$$H(z) = \frac{a + b \cdot z^{-2} + c \cdot z^{-4}}{1 + b \cdot z^{-2} + a \cdot z^{-4}} + z^{-1} \cdot \frac{c + d \cdot z^{-2} + e \cdot z^{-4}}{1 + d \cdot z^{-2} + c \cdot z^{-4}} \quad (1)$$

The transfer function of the filter 21 is the first summand of equation (1) and the transfer function of the filter 22 is the second summand of equation (1).

Figure 3:
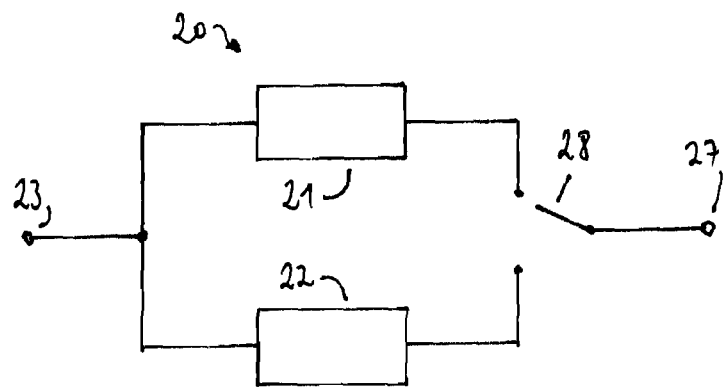
FIG. 3 schematically illustrates a further circuit diagram of a filter according to an exemplary embodiment.

The circuit of the filter 20 may be rearranged as illustrated in FIG. 3. Compared to FIG. 2 the upsampling operator 24 as well as the delay element 25 are omitted, and the adder 26 is replaced by a multiplexer 28. The multiplexer 28 takes the output data streams of the filters 21 and 22 and combines them together into one data stream in which the samples outputted by the filters 21 and 22 are arranged alternately. The functions of the filter circuits illustrated in FIGS. 2 and 3 are identical.

The allpass filters 21 and 22 may have approximately the same phase in the passband. In the stopband, the phases of the allpass filters 21 and 22 may be shifted by approximately $\pi$ with respect to each other.

The filter 20 may also be composed of more than two polyphase filter branches, each of them containing a respective allpass filter. In this case, all allpass filters have approximately the same phase in the passband and, in the stopband, the phases of the allpass filters are shifted by approximately $2\pi/N$ with respect to each other, with N being the number of the polyphase filter branches.

The group delay of the filter 20 approximates a constant if the requirement for its phase response is that it be linear. This is because the group delay $GD(\omega)$, which is just another way of looking at the phase ($\Phi$), is defined as:

$$GD(\omega) = -\frac{d}{d\omega}\Phi(\omega) \quad (2)$$

where $\omega$ is the angular frequency.

The group delay is the time delay that a frequency component experiences as it passes through the filter 20. Linear phase means that the group delay is a constant at all frequencies, i.e. the entire signal experiences only a time shift as it passes through the filter 20.

Figure 4:
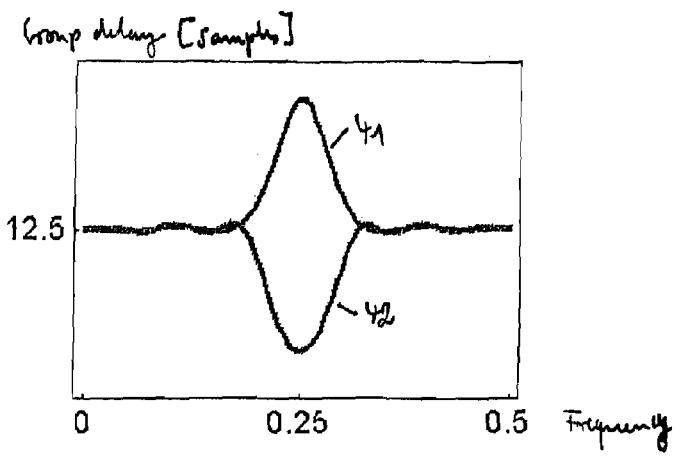
FIG. 4 illustrates a plot of group delays of allpass filters implemented in the filter.

In order to realize a constant group delay of the filter 20, the allpass filters 21 and 22 may be designed such that the sum of their individual group delays is constant. This interrelationship between the group delay 41 of the allpass filter 21 and the group delay 42 of the allpass filter 22 is illustrated in FIG. 4, where the group delays 41 and 42 are plotted versus the frequency (in units of the sampling frequency $f_s$). Since the curves of the group delays 41 and 42 are symmetrical, the sum of them is a constant. The two peaks of the group delay curves 41 and 42 are due to the implementation of the allpass filters 21 and 22. The allpass filters may be implemented in a different way so that the curves of their group delays may differ from the curves illustrated in FIG. 4. The only requirement is that the sum of the group delays of the at least two allpass filters approximates a constant.

The allpass filters 21 and 22 may be implemented as infinite impulse response (IIR) filters. Furthermore, the sum of the transfer functions of the allpass filters 21 and 22 may be power complementary, which means that the transfer function H(z) of the filter 20 fulfills the following equation (3), where f is the frequency and $f_s$ is the sampling frequency:

$$\left|H\left(e^{j\frac{2\pi f}{f_s}}\right)\right|^2 + \left|H\left(e^{j\frac{2\pi(\frac{1}{2}-f)}{f_s}}\right)\right|^2 = 1 \quad (3)$$

The allpass filters 21 and 22 may be of the same order. Alternatively, the allpass filter 21 is of the order K and the allpass filter 22 is of the order K-L and includes L additional delay elements.

The allpass filters 21 and 22 may be implemented using adaptors. Each adaptor contains a single multiplier.

The filter 20 may replace the first filter 14 or the second filter 15 in the transmission system 10 illustrated in FIG. 1. Furthermore, the filters 14 and 15 at both ends of the transmission system 10 may be replaced by filters 20. In this case, one of the filters 20 may be inverted in the time domain. Convoluting the transfer functions of the two filters of the transmission system 10 in the time domain results in a strictly complementary transfer function. A strictly complementary transfer function $H_1$ is also denoted as an amplitude complementary transfer function and satisfies the following equation:

$$\left|H_1\left(e^{j\frac{2\pi f}{f_s}}\right)\right| + \left|H_1\left(e^{j\frac{2\pi(\frac{1}{2}-f)}{f_s}}\right)\right| = 1 \quad (4)$$

If filter 20 and a root-raised-cosine filter are used as filters 14 and 15 in the transmission system 10, the two filters exhibit different attenuation characteristics in the transition band between stopband and passband. In a first part of the transition band the attenuation of the filter 20 is smaller than the attenuation of the root-raised-cosine filter. In a second part of the transition band the attenuation of the filter 20 is greater than the attenuation of the root-raised-cosine filter. Both filters, the filter 20 and the root-raised-cosine filter, are power complementary. Convoluting the filter 20 and the root-raised-cosine filter should result in intersymbol interference of less than 5%.

In the following, an example is presented where a finite impulse response filter (FIR) used as a root-raised-cosine filter and an example of the filter 20 are compared. Both filters have a roll-off factor of 0.35. The order of the FIR filter is 73. For implementing the FIR filter, 37 multipliers are needed when making use of symmetry. In contrast to this, the filter 20 has only 8 adaptors, which means that 8 multipliers are required for its implementation when making use of symmetry.

The transfer function $H_{RRC}$ of the FIR filter used as a root-raised-cosine filter of the above example is:

$$H_{RRC}(z) = \quad (5)$$

$$\frac{1}{524288} \cdot \left[ 78 + \frac{78}{z^{73}} - \frac{181}{z^{72}} + \frac{129}{z^{71}} + \frac{71}{z^{70}} - \frac{232}{z^{69}} + \frac{156}{z^{68}} + \frac{73}{z^{67}} - \frac{251}{z^{66}} + \right.$$

$$\frac{227}{z^{65}} + \frac{58}{z^{64}} - \frac{337}{z^{63}} + \frac{237}{z^{62}} + \frac{50}{z^{61}} - \frac{370}{z^{60}} + \frac{418}{z^{59}} + \frac{19}{z^{58}} - \frac{532}{z^{57}} +$$

$$\frac{510}{z^{56}} - \frac{30}{z^{55}} - \frac{598}{z^{54}} + \frac{871}{z^{53}} - \frac{107}{z^{52}} - \frac{988}{z^{51}} + \frac{1110}{z^{50}} - \frac{336}{z^{49}} - \frac{1177}{z^{48}} +$$

$$\frac{2409}{z^{47}} - \frac{623}{z^{46}} - \frac{2692}{z^{45}} + \frac{3492}{z^{44}} - \frac{2503}{z^{43}} - \frac{3873}{z^{42}} + \frac{17130}{z^{41}} -$$

$$\frac{5786}{z^{40}} - \frac{49449}{z^{39}} + \frac{54230}{z^{38}} + \frac{250905}{z^{37}} + \frac{250905}{z^{36}} + \frac{54230}{z^{35}} -$$

$$\frac{49449}{z^{34}} - \frac{5786}{z^{33}} + \frac{17130}{z^{32}} - \frac{3873}{z^{31}} - \frac{2503}{z^{30}} + \frac{3492}{z^{29}} - \frac{2692}{z^{28}} -$$

$$\frac{623}{z^{27}} + \frac{2409}{z^{26}} - \frac{1177}{z^{25}} - \frac{336}{z^{24}} + \frac{1110}{z^{23}} - \frac{988}{z^{22}} - \frac{107}{z^{21}} + \frac{871}{z^{20}} -$$

$$\frac{598}{z^{19}} - \frac{30}{z^{18}} + \frac{510}{z^{17}} - \frac{532}{z^{16}} + \frac{19}{z^{15}} + \frac{418}{z^{14}} - \frac{370}{z^{13}} + \frac{50}{z^{12}} + \frac{273}{z^{11}} -$$

$$\left. \frac{337}{z^{10}} + \frac{58}{z^{9}} + \frac{227}{z^{8}} - \frac{251}{z^{7}} + \frac{73}{z^{6}} + \frac{156}{z^{5}} - \frac{232}{z^{4}} + \frac{71}{z^{3}} + \frac{129}{z^{2}} - \frac{181}{z} \right]$$

The transfer function $H_{20}$ of the filter 20 of the above example is given by the following equation:

$$H_{10}(z) = \frac{1}{2} \cdot \left[ \frac{-\frac{19}{4096} + \frac{1}{z^{10}} - \frac{231}{1024 \cdot z^8} + \frac{439}{4096 \cdot z^6} - \frac{203}{4096 \cdot z^4} + \frac{21}{1024 \cdot z^2}}{1 - \frac{19}{4096 \cdot z^{10}} + \frac{21}{1024 \cdot z^8} - \frac{203}{4096 \cdot z^6} + \frac{439}{4096 \cdot z^4} - \frac{231}{1024 \cdot z^2}} + \frac{\frac{61}{4096} + \frac{1}{z^6} + \frac{925}{4096 \cdot z^4} - \frac{29}{512 \cdot z^2}}{1 + \frac{61}{4096 \cdot z^6} - \frac{29}{512 \cdot z^4} + \frac{925}{4096 \cdot z^2}} \cdot z^{-5} \right] \quad (6)$$

Since the filter 20 is intrinsically non-dissipative, its multipliers require a smaller word width than the multipliers of the FIR filter. This results in an implementation effort, chip area and power consumption of the filter 20 which is reduced by about 75% compared to the FIR filter.

Figure 5A:
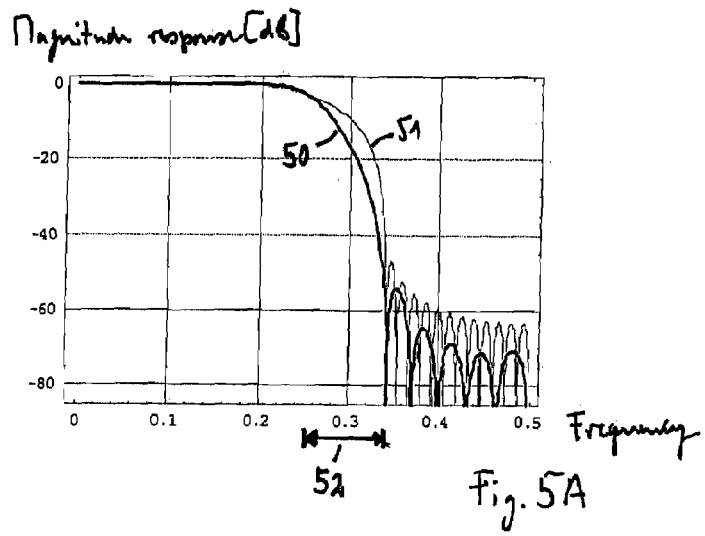
FIGS. 5A, 5B and 5C illustrate plots of the magnitude responses of an example of a filter a finite impulse response (FIR) filter.
Figure 5B:
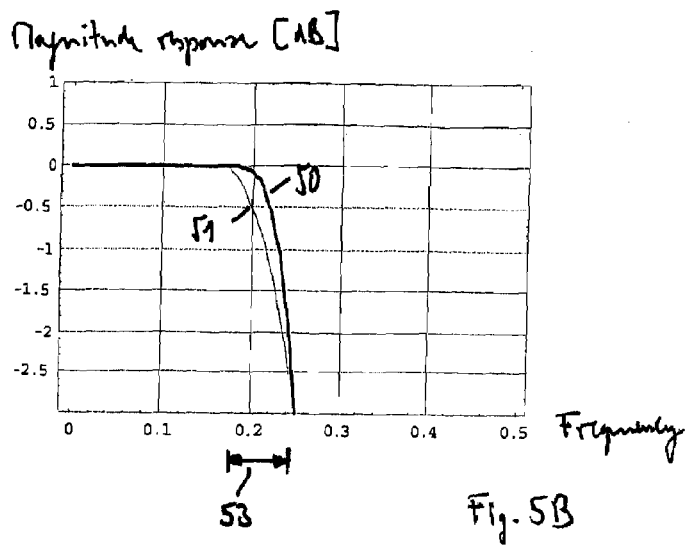
Figure 5C:
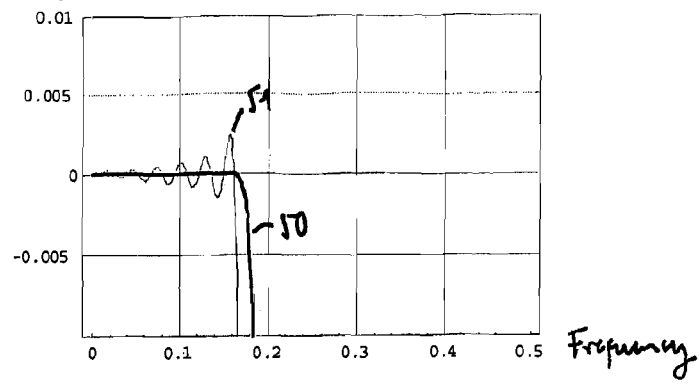
Figure 6:
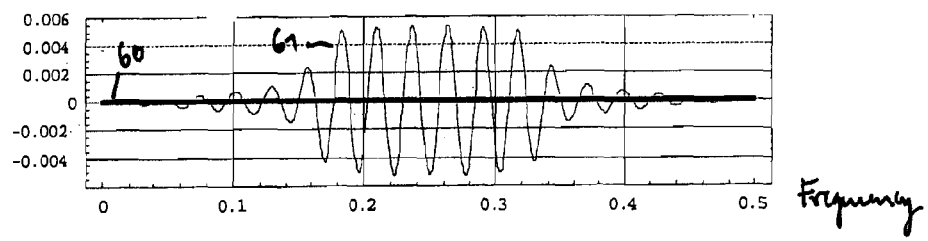
FIG. 6 illustrates a plot of the deviations of the power complementarity of a filter an FIR filter.

FIGS. 5A, 5B and 5C illustrate plots of the magnitude response 50 of the filter 20 and the magnitude response 51 of the FIR filter versus frequency (in units of the sampling frequency $f_s$). FIGS. 5A to 5C differ in the scale of the magnitude response. It is evident from FIG. 5A that the attenuation of the filter 20 in a part 52 of the transition band between passband and stopband is greater than the attenuation of the FIR filter. As can be seen from FIG. 5B, in a part 53 of the transition band the attenuation of the filter 20 is lower than the attenuation of the FIR filter. Overall, as illustrated in FIG. 6, these effects balance each other so that the filter 20 (curve 60) meets the requirement of power complementarity even better than the FIR filter (curve 61).

Figure 7:
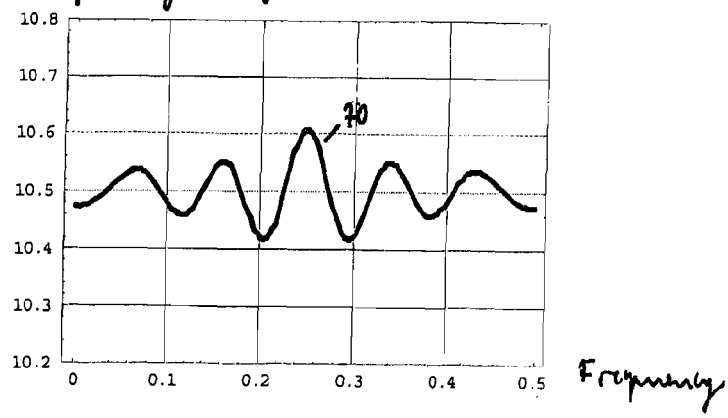
FIG. 7 illustrates a plot of the group delay of a filter.

FIG. 7 illustrates a plot of the group delay 70 of the filter 20 versus frequency (in units of the sampling frequency $f_s$). Since the group delay 70 of the filter 20 only approximates a constant, it illustrates some ripples. The ripples of the group delay 70 and the ripples of the magnitude response 50 in the passband as well as deviations in the frequency range between the passband and the stopband contribute to intersymbol interference. In order to further minimize intersymbol interference, the order of the filter 20 can be increased which results in a reduction of the ripples of the group delay 70 and the ripples of the magnitude response 50 in the passband. Moreover, an additional filter may be cascaded with the filter 20 to further reduce intersymbol interference.

Figure 8A:
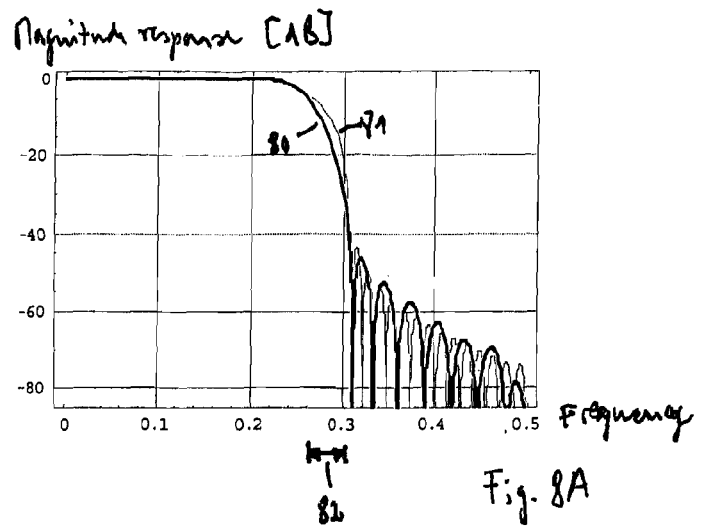
FIGS. 8A, 8B and 8C illustrate plots of the magnitude responses of another example of a filter another FIR filter.
Figure 8B:
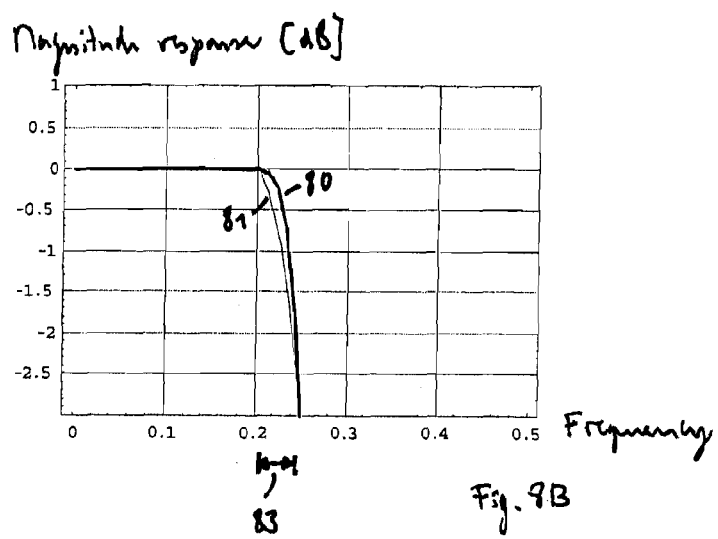
Figure 8C:
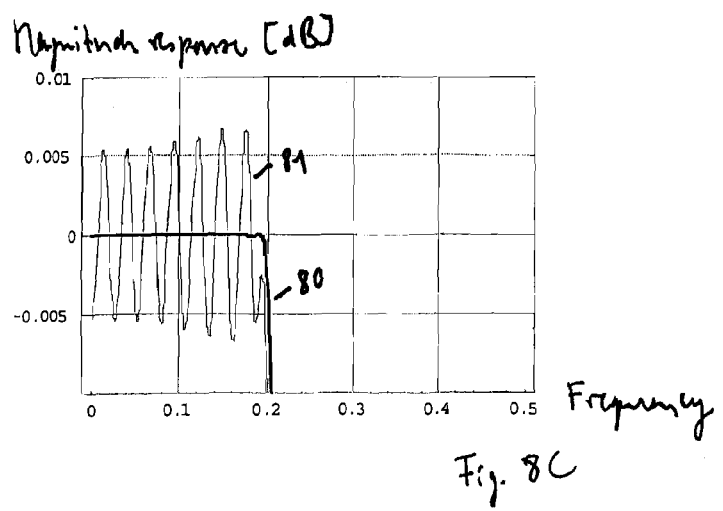
Figure 9:
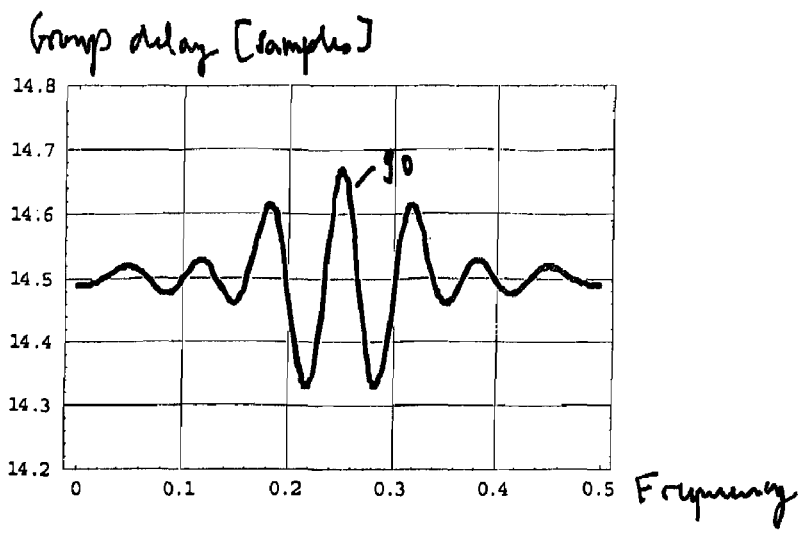
FIG. 9 illustrates a plot of the group delay of a filter.
Figure 10:
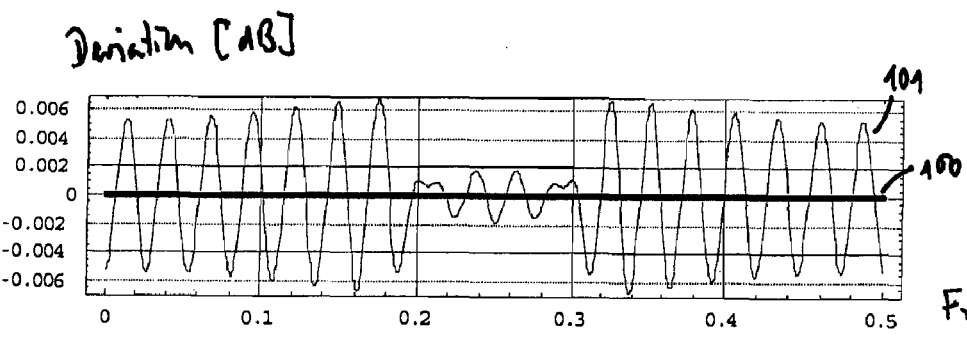
FIG. 10 illustrates a plot of the deviations of the power complementarity of a filter and an FIR filter.

In FIGS. 8A, 8B and 8C the magnitude responses of another comparison of an example of the filter 20 (curve 80) and an FIR filter (curve 81) are presented. The group delay 90 of the filter 20 and the deviation of the power complementarity of the filter 20 (curve 100) as well as the FIR filter (curve 101) are illustrated in FIGS. 9 and 10. Both filters have a roll-off factor of 0.22. The order of the FIR filter is 73, and 37 multipliers are required for the implementation of the FIR filter. The filter 20 is composed of a first allpass filter of the order 7 and a second allpass filter of the order 5 including a delay element $z^{-5}$. For implementing the filter 20, 12 multipliers are needed when making use of symmetry. As in FIGS. 5A to 5C, the attenuation of the filter 20 in a part 82 of the transition band between passband and stopband is greater than the attenuation of the FIR filter (cf. FIG. 8A). As can be seen from FIG. 8B, in a part 83 of the transition band the attenuation of the filter 20 is lower than the attenuation of the FIR filter.

In addition, while a particular feature or aspect of an embodiment of the invention may have been disclosed with respect to only one of several implementations, such feature or aspect may be combined with one or more other features or aspects of the other implementations as may be desired for any given or particular application. Furthermore, to the extent that the terms "include", "have", "with", or other variants thereof are used in either the detailed description or the claims, such terms are intended to be inclusive in a manner similar to the term "comprise". The terms "coupled" and "connected", along with derivatives may have been used. It should be understood that these terms may have been used to indicate that two elements co-operate or interact with each other regardless whether they are in direct physical or electrical contact, or they are not in direct contact with each other. Furthermore, it should be understood that embodiments of the invention may be implemented in discrete circuits, partially integrated circuits or fully integrated circuits or programming means. Also, the term "exemplary" is merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system having a filter, comprising:
    at least two polyphase filter branches, each of the polyphase filter branches comprising a recursive allpass filter, wherein the filter approximates a linear filter, and wherein curves of the group delays of the at least two polyphase filter branches plotted versus a frequency are symmetrical with respect to a frequency axis such that the sum of group delays of the polyphase filter branches approximates a constant.

2. The system of claim 1, comprising wherein the allpass filters have approximately the same phase in the passband.

3. The system of claim 1, comprising wherein the phases of the allpass filters are shifted by approximately $2\pi/N$ with respect to each other in the stopband, wherein N is the number of the polyphase filter branches.

4. The system of claim 1, comprising wherein the group delay of the filter approximates a constant.

5. The system of claim 1, comprising wherein the allpass filters are IIR filters.

6. The system of claim 1, comprising wherein the filter approximates a root-raised-cosine filter.

7. The system of claim 1, comprising wherein the sum of the transfer functions of the allpass filters is power complementary.

8. The system of claim 1, comprising wherein the allpass filters are of the same order.

9. The system of claim 1, wherein the order of the allpass filters is K and at least one of the allpass filters comprises a filter of the order K-L and L delay elements.

10. The system of claim 1, further comprising:
    a transmitting station including the filter.

11. The system of claim 1, further comprising:
a receiving station including the filter.

12. A system having a filter, comprising:
means for providing a transmitting station comprising at least two polyphase filter branches, each of the polyphase filter branches comprising a recursive allpass filter, wherein the filter approximates a linear filter, and wherein curves of the group delays of the at least two polyphase filter branches plotted versus a frequency are symmetrical with respect to a frequency axis such that the sum of group delays of the polyphase filter branches approximates a constant; and
means for providing a receiving station comprising at least two polyphase filter branches, each of the polyphase filter branches comprising a recursive allpass filter, wherein the filter approximates a linear filter.

13. The system of claim 1, comprising:
an upsampling operator configured to upsample input samples and to feed the upsampled input samples to each of the at least two polyphase filter branches; and
an adder to sum signal output by the at least two polyphase filter branches.

14. The system of claim 1, wherein one of the at least two polyphase filter branches comprises a delay element upstream of the recursive allpass filter.

15. The system of claim 1, comprising a multiplexer to combine data streams output by the at least two polyphase filter branches into one data stream.

16. A system having a filter, comprising:
at least two polyphase filter branches, each of the polyphase filter branches comprising a recursive allpass filter, wherein the filter approximates a linear filter, and wherein the sum of group delays of the polyphase filter branches approximates a constant, wherein the filter has a transfer function, Hz, where $$H(z) = \frac{a + b \cdot z^{-2} + c \cdot z^{-4}}{1 + b \cdot z^{-2} + a \cdot z^{-4}} + z^{-1} \cdot \frac{c + d \cdot z^{-2} + e \cdot z^{-4}}{1 + d \cdot z^{-2} + c \cdot z^{-4}}.$$

* * * * *